United States Patent [19]

Levinn

[11] 4,075,678
[45] Feb. 21, 1978

[54] FAIL SAFE CIRCUIT FOR HEAT GENERATING DEVICE

[75] Inventor: Robert N. Levinn, Catskill, N.Y.

[73] Assignee: American Thermostat Corporation, Cairo, N.Y.

[21] Appl. No.: 657,742

[22] Filed: Feb. 13, 1976

[51] Int. Cl.² .............................................. H02H 5/04
[52] U.S. Cl. .................................... 361/104; 219/413
[58] Field of Search ............ 317/40 A, 40 R, 16, 317/13 C, 13 A; 337/31, 32; 219/413, 408, 446, 486, 480, 494, 507, 510, 511; 361/103, 104, 105, 106

[56] References Cited

U.S. PATENT DOCUMENTS

| 2,370,037 | 2/1945 | Hurst | 317/40 A X |
| 2,810,865 | 10/1957 | Minder | 317/40 A X |
| 3,524,105 | 4/1970 | Harner et al. | 317/40 A X |
| 3,560,711 | 2/1971 | Manecke | 219/413 |
| 3,628,093 | 12/1971 | Crowley | 317/40 A X |
| 3,899,656 | 8/1975 | Smith | 219/413 |

FOREIGN PATENT DOCUMENTS

| 2,010,891 | 10/1971 | Germany | 317/40 A |
| 1,263,373 | 2/1972 | United Kingdom | 317/40 A |

*Primary Examiner*—J D Miller
*Assistant Examiner*—Patrick R. Salce
*Attorney, Agent, or Firm*—James & Franklin

[57] ABSTRACT

A heat generating device, such as an oven, includes a heating element connected to a power source and a fuse interposed therebetween. The fuse is effective, when the magnitude of the current flowing thereto exceeds the fuse rating, to disconnect the element from the source. A thermostat is included in the circuit to control the current flow and, thus, the temperature level. In the event of a malfunction of the thermostat, temperature responsive means are effective, when the temperature sensed thereby exceeds a given level, to increase the current flowing through the fuse beyond the fuse rating. The temperature responsive means includes a temperature sensitive switch and a resistive element which may be a second heating element. When the switch is closed by excessive temperature, the resistive element is placed in parallel with the heating element, thus lowering the effective resistance of the circuit to increase the current.

19 Claims, 1 Drawing Figure

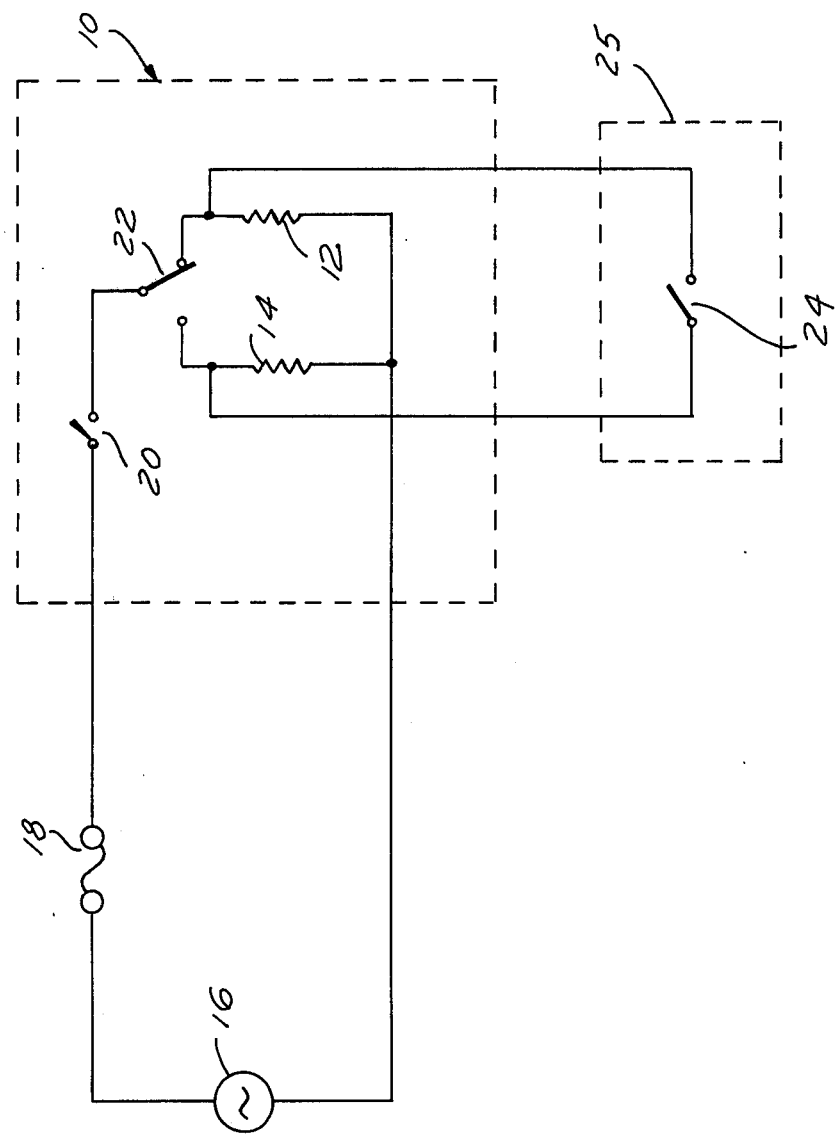

FAIL SAFE CIRCUIT FOR HEAT GENERATING DEVICE

The present invention relates to temperature regulating means for heat generating devices and, more particularly, to a fail safe circuit to prevent the overheating of a heat producing element due to a malfunction in the primary thermostat.

Heat generating devices such as industrial or commercial ovens or the like normally include an insulated enclosure or chamber in which one or more electrically energized heat producing elements are situated. The heating elements are normally resistive in nature and connected to an electrical power source by means of a fuse or circuit breaker which is current sensitive so as to protect the device from an electrical overload.

Often, the heat generating device is controlled by a thermostat which regulates the current flow to the heating element in accordance with the desired temperature. Such thermostats are normally of the capillary type which include a current control device which is remote from the temperature sensing portion, the latter being situated within the chamber. In this manner, the temperature in the chamber is sensed and utilized to control the current flow to the heating elements so as to regulate the amount of heat produced.

Many heat generating devices of this type comprise two separate heat producing elements, which may be located at different positions within the chamber. A selector switch is provided so that the user can select which of these elements are to be energized. For instance, in an oven, one element which may be located at the bottom of the oven chamber, may be used for normal oven cooking, whereas a second element, located at the top of the oven chamber, may be used for broiling, toasting, etc. Normally, the elements cannot be energized simultaneously, only alternatively.

In ovens of this type, the thermostat, which is the primary temperature control, may malfunction and thus fail to prevent the energization of one or the other of the heating elements when the temperature in the chamber has reached the desired level. In this event, the heat producing element will continue to produce heat in an uncontrolled fashion until a fire occurs and/or the element is destroyed.

Since malfunction of the thermostat is a very real possibility, carrying with it serious consequences, it is desirable to provide such devices with a safety limit control which will serve to deenergize the heat producing element in the event of a malfunction of the primary control. One manner in which to accomplish this objective would be to utilize a secondary control in the form of a second thermostat of the capillary type, the control device of which is placed in series with the control device of the primary thermostat. However, such thermostats are expensive to produce and may require an additional opening in the wall of the chamber for the installation thereof.

It is, therefore, a prime object of the present invention to provide a fail safe circuit for use with a heat generating device which automatically increases the circuit current beyond the fuse rating in the event of a malfunction of the thermostat.

It is another object of the present invention to provide a fail safe circuit for use with a heat generating device comprising a temperature sensitive switch and resistive means which, when the switch is activated by excessive temperature, places the resistive means in a parallel relationship with the heat producing element.

It is a further object of the present invention to provide a fail safe circuit for use in a heat generating device wherein the resistive means constitutes a second heat producing element.

It is still another object of the present invention to provide a fail safe circuit for use with a heat generating device wherein the temperature sensitive switch is located externally to the chamber in which the heat producing elements are situated.

In accordance with the present invention, a fail safe circuit for use in conjunction with a heat generating device is provided. The device includes a power source, a heat producing element operably connected to the power source to be energized thereby and current sensitive circuit interrupting means operably interposed between the element and the source which is effective, when the magnitude of the current flowing therethrough exceeds a given level, to disconnect the element from the source. The fail safe circuit includes temperature responsive means which are operably connected to the circuit interrupting means and are effective, when the temperature of the element exceeds a given level, to increase the current flowing through the circuit interrupting means beyond the given level.

The heat producing element is resistive in nature, such as a heating coil. The temperature responsive means comprises a temperature sensitive switch and resistive means. The temperature sensitive switch is effective to place the resistive means in a parallel circuit relationship with the element when actuated by a temperature level which indicates a malfunction in the primary thermostat. The value of the combined resistance of the resistive heating element and the resistive means, divided into the voltage of the source, exceeds the given current level and, therefore, will serve to cause the circuit interrupting means to disconnect the element from the source.

When the heat producing device is an oven, the resistive means may constitute a second heat producing element. The first and second heat producing elements are normally alternatively connectable to the source by means of a selector switch. No load current flows through the fail safe circuit under normal operating conditions. However, when the temperature sensitive switch detects a temperature which exceeds the given value, both of the elements are connected in a parallel circuit relationship with the source, thereby reducing the combined resistance of the circuit so that a level of current greater than the rating of the current interrupting means flows therethrough, thereby causing same to disconnect the elements from the circuit.

To the accomplishment of the above and to such other objects as may hereinafter appear, the present invention relates to a fail safe circuit for use with a heat generating device as set forth in the annexed claims and described in the specification taken together with the accompanying drawing which is a schematic diagram of a heat generating device, including the circuit of the present invention.

The present invention is a fail safe circuit designed for use in conjunction with an electrically energized work element. While the work element may be any one of a variety of different electrically energized components, the present invention will herein be described, for purposes of illustration, as it is used in an oven. However, it should be understood that the present invention has application in devices other than ovens and the present description of the circuit in conjunction with an oven should not be construed as a limitation on the scope of the present invention.

FIG. 1 shows a schematic diagram of a preferred embodiment of the present invention designed for use in an oven. In this diagram, the dashed box, generally designated 10, indicates the oven chamber or enclosure and is included in the diagram to illustrate which portions of the circuit of the present invention are included within the oven chamber or enclosure and which portions are situated outside thereof.

Within enclosure 10 are a pair of heating elements, 12 and 14, each of which, for example, is rated at 12 amps, and 240 volts. One of the heating elements, for instance, element 12, may be located at the bottom of the oven chamber and used for normal oven cooking and the other element 14, for example, may be located at the top of the oven enclosure and be utilized for broiling, toasting, etc.

Only one of the heating elements 12, 14 is normally energized at any one time. A power source 16 is provided to energize heating elements 12 and 14. Power source 16 may, for instance, be a 240 volt alternating current source. The remainder of the heating circuit comprises a current sensitive circuit interrupting means 18, which may take the form of a fuse or resettable circuit breaker, a conventional capillary-type thermostat 20, with its temperature sensing portion located within enclosure 10 and a selector switch 22, all of which are in series with the heating elements. Selector switch 22, under normal conditions, selects one or the other of the heating elements 12 or 14 to be energized by source 16.

The fail safe circuit preferably comprises a heat sensitive switch 24, preferably a simple, normally open bimetallic or similar thermostat which is situated outside enclosure 10 at 25 in a position to sense oven temperature and which is calibrated so as to complete a circuit when a predetermined temperature is sensed. Switch 24 is connected into the circuit in such a manner so as to place both of the heating elements 12 and 14 in a parallel relationship within the above-described series circuit so as to increase the current flow through current sensitive circuit interrupting means 18 to the point where the current sensitive circuit interrupting means is tripped to disconnect the heating elements from the source. More specifically, in the circuit shown, switch 24 is connected between the selector switch 22 and one side of each of the elements 12, 14, respectively, so as to energize both elements 12, 14 simultaneously when closed.

The fail safe circuit actually comprises the bimetallic or similar thermostat 24 in series with a resistance of appropriate value. However, it is convenient and economical to utilize the non-operative heating element as this resistance. This is, however, not a requirement of the present invention. The present invention requires only that the heat sensitive switch 24, when actuated, be effective to increase the current through the circuit interrupting means beyond the rating thereof. This can be conveniently accomplished by lowering the combined resistance of the circuit to a level wherein the current flowing through the current sensitive circuit interrupting means 18 is increased above the rating thereof.

For instance, if current sensitive circuit interrupting means 18 is a fuse with a normal rating of 15 amps and each of the heating coils 12, 14 is rated at 12 amps and 240 volts, then under normal operation, when either one of the heating coils 12, 14, but not both, are energized by source 16, 12 amps flows through fuse 18. Thus, the amperage flowing through the fuse is less than the rating thereof and the oven will operate normally. However, a malfunction of thermostat 20 will cause the heating coil connected to source 16, by means of selector switch 22, to overheat the oven. When the temperature sensed by the temperature sensitive switch 24 reaches a predetermined level, switch 24 will close, causing the normally non-energized fail safe circuit to connect heating coils 12 and 14 in parallel relationship in the over circuit. Connecting heating coils 12 and 14 in parallel relationship effectively reduces the combined resistance of the circuit such that the current flowing through fuse 18 will exceed the normal amperage rating thereof, thereby causing the fuse to disconnect source 16 from the heating coils and turn the oven off.

If each of the heating coils 12, 14 is rated at 12 amps and 240 volts, then each has a resistance of 20 ohms. When the heating coils are placed in parallel, the combined resistance thereof is 10 ohms. Since the source 16 is a 240 volt source, when a 10 ohm resistance is connected in series therewith, the current flowing through the circuit will be 24 amps. Since 24 amps exceeds the normal current rating of fuse 18, fuse 18 will be blown, thus disconnecting source 16 from the oven circuit.

The circuit values given above are merely for purposes of illustration and should not be construed as a limitation on the present invention. The system can be made to operate at any power level by a suitable choice of fuse rating. Further, the fuse can be placed at any convenient place on the oven to facilitate replacement. Moreover, the fuse may be substituted by a thermobreaker of the manual reset type, if desired.

It should be noted that under normal operating conditions the load current does not pass through the temperature responsive means which comprises the temperature sensitive switch 24 and a resitive element, which, for purposes of explanation, has herein been described as the second heating element. It is not until the oven overheats due to a malfunction of thermostat 20, and thus closes temperature sensitive switch 24, that the load current will flow through the temperature responsive means.

Therefore, the present invention is a fail safe circuit for use in conjunction with an electrically energized work element which provides a simple and low cost safety limit control in the event of a malfunction of the primary thermostat. This is accomplished through the use of a simple bimetallic or similar switch which is located at a remote position from the work element and which, when the appropriate overheating temperature is sensed, will cause the current flowing through a current sensitive circuit interrupting means to exceed the rating thereof, thereby disconnecting the work element from the power source. The fail safe circuit increases the current flow in the working circuit by decreasing the effective resistance thereof. This effect is achieved by simply placing a second resistance of suitable value in parallel with the work element. Thus, the fail safe circuit comprises a temperature sensitive switch and a resistance which are connected to the working circuit in such a manner that when the temperature sensitive switch is actuated, the resistance is placed in parallel with the work element. The resistive element which forms a portion of the fail safe circuit may be a resistive element placed in that circuit for this purpose or may be any other resistive element already present in the apparatus, such as a heating coil or the like, thereby eliminating the necessity for duplicating parts.

While only a single embodiment of the present invention has been disclosed herein for purposes of illustration, it is obvious that many variations and modifications can be made thereto. It is intended to cover all of these variations and modifications which fall within the scope of the present invention as defined by the annexed claims.

I claim:

1. A working circuit comprising a source, means for interrupting the working circuit when the current therethrough exceeds a given level and a first heating element in series with one another, and a fail safe circuit situated in parallel with said first heating element and comprising, in series, a second heating element and a normally opened temperature responsive switch means for connecting said second heating element in parallel with said first heating element when the temperature sensed thereby exceeds a given level whereby load current does not normally pass through said temperature responsive switch means and whereby, when said given temperature level is sensed by said switch means, the current in the working circuit is increased to the point where said current sensitive circuit interrupting means is actuated to open said working circuit.

2. The circuit of claim 1 further comprising a selector switch in said working circuit effective to normally connect only a selected one of said heating elements into said working circuit.

3. The circuit of claim 2 further comprising a thermostat in said working circuit.

4. The circuit of claim 2 wherein said first and second heating elements are the heating and broiling elements, respectively, of said oven.

5. The circuit of claim 1 further comprising a thermostat in said working circuit.

6. The working circuit of claim 1 wherein said working circuit forms a part of an oven.

7. The working circuit of claim 6 wherein said first heating element is in the oven heating element and is situated within an oven enclosure.

8. The working circuit of claim 7 wherein said second heating is the oven broiling element and is situated within said enclosure.

9. The working circuit of claim 8 wherein said switch means is situated outside said enclosure.

10. A circuit for use in an oven or the like of the type having an oven chamber, said circuit comprising an oven heating element situated in the oven chamber and an electric power source, said element being operably connected to said source to be energized thereby, current sensitive circuit interrupting means operatively interposed between said element and said source and effective, when the magnitude of the current flowing therethrough exceeds a given level, to disconnect said element from said source, and temperature responsive means, comprising a temperature sensitive switch located outside said oven chamber and an oven broiling element situated within the oven chamber, operably connected to said circuit interrupting means and effective, when the temperature sensed thereby exceeds a given level, to increase the current flowing through said circuit interrupting means beyond said given level.

11. The circuit of claim 10 further comprising a thermostat operatively interposed between said elements and said source.

12. A circuit for use in an oven and adapted to be connected to an electric power source, said circuit comprising the heating and broiling elements, located within the oven chamber, only one of which is normally connectable at a time to said source to be energized by same, current sensitive circuit interrupting means interposed between said source and said elements and effective, when the magnitude of the current flowing therethrough exceeds a given level, to disconnect said elements from said source, temperature responsive means operably connected to said elements and effective, when sensing a predetermined temperature, to place both of said elements in parallel with one another in said circuit so as to increase the current flow through said circuit interrupting means beyond said given level.

13. An oven having a heating element and a broiling element comprising a source, current sensitive circuit interrupting means and a selector switch effective to normally connect only a selected one of said heating and broiling elements in series with said source, and a fail safe circuit situated in parallel with said heating element and comprising, in series, a normally opened temperature sensitive switch means and said broiling element whereby normal load current does not pass through said temperature responsive means and whereby, when said switch closes, said broiling element is connected in parallel with said heating element such that the current through said current sensitive interrupting means is increased to a level wherein said heating element is disconnected from said source.

14. A working circuit for an oven of the type having a heating element and a broiling element situated within the oven enclosure, said circuit comprising a source, current circuit interrupting means and the oven heating element operatively connected in series with one another and a fail safe circuit situated in parallel with said heating element and comprising, in series, a normally open temperature responsive switch means located outside of said oven chamber and a broiling element, whereby normal load current does not pass through said temperature responsive means and whereby, when said switch means closes, said broiling element is connected in parallel with said heating element and increases the current in the working circuit to the point where said current sensitive circuit interrupting means is actuated to open said circuit.

15. A circuit for use in a heat producing device and adopted to be connected to an electric power source, said circuit comprising first and second heating elements only one of which is normally connectable at a time to said source to be energized by same, current sensitive circuit interrupting means interposed between said source and said elements and effective, when the magnitude of the current flowing therethrough exceeds a given level, to disconnect said elements from said source, said heating elements when situated in parallel, having a combined resistance which, when divided by the voltage of said source, will cause the current passing therethrough to exceed said given current level, and temperature responsive means operatively connected to said elements and effective, upon sensing a predetermined temperature, to place both of said elements in parallel with one another in said circuit such that the current flow through said circuit interrupting means is increased beyond said given level.

16. The circuit of claim 15 further comprising a selector switch operatively interposed between said source and said elements and effective to normally engage only one of said elements at a time.

17. A working circuit for use in an oven and adopted to be connected to an electric power source, said circuit comprising heating and broiling elements only one of which is normally connectable at a time to said source to be energized by same, current sensitive circuit interrupting means interposed between said source and said elements and effective, when the magnitude of current flowing therethrough exceeds a given level, to disconnected said elements from said source, and temperature responsive means operatively connected to said elements and effective, upon sensing a predetermined temperature, to place both of said elements in parallel with one another in said circuit so as to increase the current flow through said circuit interrupting means beyond said given level.

18. In an oven of this type having a selected one of electrically energized heating and broiling elements connected in series with a power source by a selector and a current responsive circuit interrupting means interposed between the source and said selected element and effective when the magnitude of current flowing therethrough exceeds a given level, to disconnect said selected element from the source, the improvement comprising temperature responsive means operatively connected to the elements and effective, when the temperature since thereby exceeds a given level, to operatively connect the non-selected element in parallel with said selected element so as to increase the current through said current responsive circuit interrupting means beyond said given level.

19. In a heat producing apparatus of the type having first and second electrically energized heating elements, selector means, said selector means connecting one of said elements in series with a power source and current responsive circuit interrupting means interposed between the source and said selected element and effective, when the magnitude of current flowing therethrough exceeds a given level, to disconnect said selector element from the source, the combined resistance of said heating elements, when situated in parallel, divided into the voltage of said source, will cause the current flow therethrough to exceed said given current level, the improvement comprising temperature responsive means and operably connected to the elements and effective, when the temperature since thereby exceeds a given level, to operably connect the non-selected element in parallel with the selected element so as to increase the current through said current responsive circuit interrupting means beyond said given limit.

* * * * *